(12) United States Patent
Montemerlo et al.

(10) Patent No.: US 9,494,942 B1
(45) Date of Patent: *Nov. 15, 2016

(54) ENHANCING BASIC ROADWAY-INTERSECTION MODELS USING HIGH INTENSITY IMAGE DATA

(71) Applicant: Google Inc., Mountain View, CA (US)

(72) Inventors: Michael Steven Montemerlo, Mountain View, CA (US); John Tisdale, Berkeley, CA (US); Vadim Furman, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/724,243

(22) Filed: May 28, 2015

Related U.S. Application Data

(63) Continuation of application No. 14/161,295, filed on Jan. 22, 2014, now Pat. No. 9,081,383.

(51) Int. Cl.
    *G05D 1/02* (2006.01)
(52) U.S. Cl.
    CPC .......... *G05D 1/0274* (2013.01); *G05D 1/0212* (2013.01); *G05D 1/0246* (2013.01); *G05D 1/0248* (2013.01)
(58) Field of Classification Search
    CPC   G01C 21/005; G01C 21/30; G01C 21/3602; G05D 1/0044; G05D 1/0274; G05D 1/0278; G05D 1/0248; G06K 9/00798
    See application file for complete search history.

(56) References Cited

U.S. PATENT DOCUMENTS

| | | | | |
|---|---|---|---|---|
| 5,307,419 | A  * | 4/1994 | Tsujino | ................ G05D 1/0223 348/119 |
| 6,191,704 | B1 * | 2/2001 | Takenaga | ................ G01S 13/42 180/169 |
| 8,138,960 | B2 | 3/2012 | Nonaka et al. | |
| 8,195,394 | B1 | 6/2012 | Zhu et al. | |

(Continued)

FOREIGN PATENT DOCUMENTS

| | | | |
|---|---|---|---|
| JP | 05297941 A | 11/1993 | |
| JP | 08044428 A | 2/1996 | |

(Continued)

OTHER PUBLICATIONS

JPO machine translation of JP 2001-331787 (original JP document published Nov. 30, 2001).

(Continued)

*Primary Examiner* — Behrang Badii
*Assistant Examiner* — David Testardi
(74) *Attorney, Agent, or Firm* — McDonnell Boehnen Hulbert & Berghoff LLP

(57) ABSTRACT

Systems and methods are provided that may optimize basic models of an intersection in a roadway with high intensity image data of the intersection of the roadway. More specifically, parameters that define the basic model of the intersection in the roadway may be adjusted to more accurately define the intersection. For example, by comparing a shape of the intersection predicted by the basic model with extracted curbs and lane boundaries from elevation and intensity maps, the intersection parameters can be optimized to match real intersection-features in the environment. Once the optimal intersection parameters have been found, roadgraph features describing the intersection may be extracted.

23 Claims, 9 Drawing Sheets

(56) References Cited

U.S. PATENT DOCUMENTS

| | | |
|---|---|---|
| 8,340,360 B2 | 12/2012 | Chen et al. |
| 8,451,141 B2 | 5/2013 | Uechi et al. |
| 8,565,958 B1 | 10/2013 | Montemerlo et al. |
| 8,612,135 B1 | 12/2013 | Montemerlo et al. |
| 2005/0002558 A1 | 1/2005 | Franke et al. |
| 2007/0208507 A1* | 9/2007 | Gotoh .................. G01C 21/30 701/414 |
| 2008/0056535 A1* | 3/2008 | Bergmann ............ G01C 21/30 382/103 |
| 2008/0240505 A1* | 10/2008 | Nakamura ............ G01C 21/26 382/103 |
| 2008/0240506 A1* | 10/2008 | Nakamura ............ G01C 11/00 382/104 |
| 2008/0240573 A1* | 10/2008 | Nakamura ............ G01C 21/26 382/190 |
| 2008/0273757 A1* | 11/2008 | Nakamura ............ G01C 21/26 382/104 |
| 2010/0208937 A1 | 8/2010 | Kmiecik et al. |
| 2011/0054791 A1* | 3/2011 | Surampudi .......... G01C 21/005 701/472 |
| 2012/0065811 A1* | 3/2012 | Nakamura ............ G01C 21/30 701/1 |
| 2013/0311047 A1 | 11/2013 | Denaro |

FOREIGN PATENT DOCUMENTS

| | | | |
|---|---|---|---|
| JP | 2001250199 A | | 9/2001 |
| JP | 2001331787 A | | 11/2001 |
| JP | 2002148064 A | | 5/2002 |
| JP | 2003331295 A | | 11/2003 |
| JP | 2005337863 A | | 12/2005 |
| JP | 2007241470 A | | 9/2007 |
| JP | 2007271515 A | | 10/2007 |
| JP | 2008065087 A | | 3/2008 |
| JP | 2008275381 A | | 11/2008 |
| JP | 2010282393 A | | 12/2010 |
| JP | 2011027594 A | * | 2/2011 |
| JP | 2013036856 A | | 2/2013 |
| WO | 2008009966 A2 | | 1/2008 |

OTHER PUBLICATIONS

JPO machine translation of JP 2008-65087 (original JP document published Mar. 21, 2008).

JPO machine translation of JP 2008-275381 (original JP document published Nov. 13, 2008).

* cited by examiner

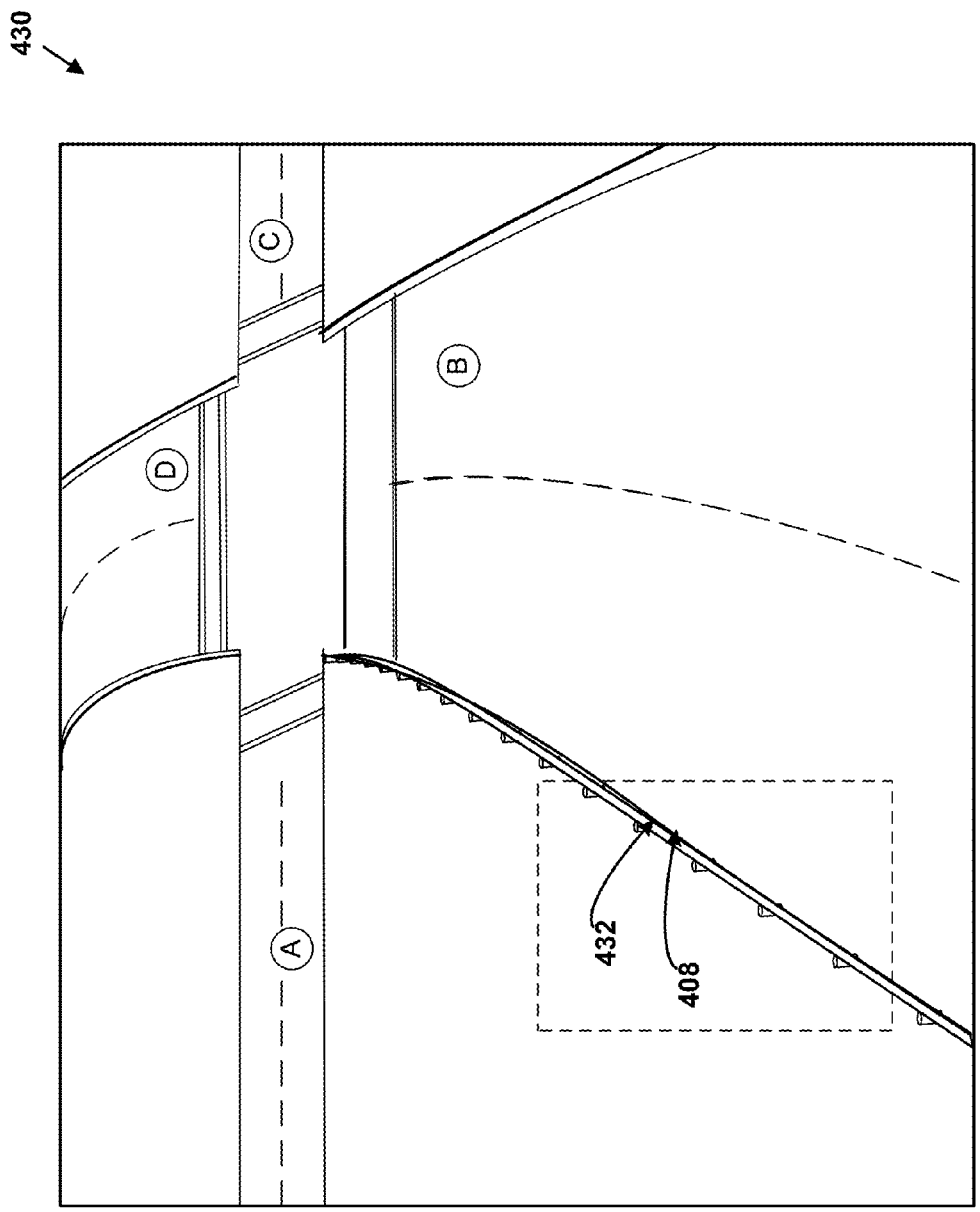

ENHANCING BASIC ROADWAY-INTERSECTION MODELS USING HIGH INTENSITY IMAGE DATA

CROSS REFERENCE TO RELATED APPLICATION

The present application is a continuation of U.S. patent application Ser. No. 14/161,295, filed on Jan. 22, 2014, and entitled "Enhancing Basic Roadway-Intersection Models using High Intensity Image Data," which is herein incorporated by reference as if fully set forth in this description.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates. The vehicle and its associated computer-implemented controller use the detected information to navigate through the environment. For example, if the sensor(s) detect that the vehicle is approaching an obstacle, as determined by the computer-implemented controller, the controller adjusts the directional controls of the vehicle to cause the vehicle to navigate around the obstacle.

SUMMARY

For vehicles operating in an autonomous mode, perceiving and recognizing objects and structures in an environment of the vehicle may be helpful. For example, autonomous vehicles may need to quickly observe, perceive, and understand intersections of a road (or road network) in their environment in order to properly operate in the intersection. In such cases, the autonomous vehicles may utilize detailed maps of the environment to help them operate. These detailed maps may, for example, include synthetic intensity and elevation imagery tiles and/or a symbolic representation of the road network called a "roadgraph." Using the roadgraph, the autonomous vehicle may operate in the environment.

In a first aspect, a method is provided. The method may include receiving, using a computing device, parameterized intersection data indicative of an intersection in a roadway of an environment. The parameterized intersection data may include a plurality of parameters that define the intersection in the environment. The method may also include based on the plurality of parameters, determining a first configuration of the intersection. The first configuration of the intersection may include one or more of predicted curb locations, predicted lane locations, or predicted pedestrian-control line locations. The method may additionally include receiving map data based on a detection of the roadway in the environment by sensors on a vehicle that traverses the environment. The map data may include one or more of candidate curb locations of the intersection, candidate lane locations of the intersection, or candidate pedestrian-control lines of the intersection. The method may further include performing a first optimization of the predicted curb locations to the candidate curb locations to minimize correspondence error between the predicted curb locations and the candidate curb locations for optimal curb locations. The method may yet further include performing a second optimization of the predicted lane locations to the candidate lane locations to minimize correspondence error between the predicted lane locations and the candidate lane locations for optimal lane locations. The method may still further include performing a third optimization of the predicted pedestrian-control lines to the candidate pedestrian-control lines to minimize correspondence error between the predicted pedestrian-control line locations and the candidate pedestrian-control line locations for optimal pedestrian-control line locations. The method may still even further include based on one or more of the first optimization, the second optimization, and the third optimization, determining a second configuration of the intersection that may include the optimal curb locations, the optimal lane locations, and the optimal control line locations.

In a second aspect, a system is provided. The system may include a computer system. The computer system may be configured to receive parameterized intersection data indicative of an intersection in a roadway of an environment. The parameterized intersection data may include a plurality of parameters that define the intersection in the environment. The computer system may also be configured to, based on the plurality of parameters, determine a first configuration of the intersection. The first configuration of the intersection may include one or more of predicted curb locations, predicted lane locations, or predicted pedestrian-control line locations. The computer system may additionally be configured to receive map data based on a detection of the roadway in the environment by sensors on a vehicle that traverses the environment. The map data may include one or more of candidate curb locations of the intersection, candidate lane locations of the intersection, or candidate pedestrian-control lines of the intersection. The computer system may further be configured to perform a first optimization of the predicted curb locations to the candidate curb locations to minimize correspondence error between the predicted curb locations and the candidate curb locations for optimal curb locations. The computer system may still further be configured to perform a second optimization of the predicted lane locations to the candidate lane locations to minimize correspondence error between the predicted lane locations and the candidate lane locations for optimal lane locations. The computer system may still even further be configured to perform a third optimization of the predicted pedestrian-control lines to the candidate pedestrian-control lines to minimize correspondence error between the predicted pedestrian-control line locations and the candidate pedestrian-control line locations for optimal pedestrian-control line locations. The computer system may still even further be configured to, based on one or more of the first optimization, the second optimization, and the third optimization, determine a second configuration of the intersection that may include the optimal curb locations, the optimal lane locations, and the optimal control line locations.

In a third aspect, a non-transitory computer readable medium having stored therein instructions that when executed by a computer system in a vehicle, cause the computer system to perform functions is disclosed. The functions may include receiving, using the computer system, parameterized intersection data indicative of an intersection in a roadway of an environment. The parameterized intersection data may include a plurality of parameters that define the intersection in the environment. The functions may also include based on the plurality of parameters, determining a first configuration of the intersection. The first configuration of the intersection may include one or more of predicted curb locations, predicted lane locations, or predicted pedestrian-control line locations. The functions may additionally include receiving map data based on a detection of the roadway in the environment by sensors on a vehicle that traverses the environment. The map data may include one or more of candidate curb locations of the intersection, candidate lane locations of the intersection, or candidate pedestrian-control lines of the intersection. The functions may further include performing a first optimization of the predicted curb locations to the candidate curb locations to minimize correspondence error between the predicted curb locations and the candidate curb locations for optimal curb locations. The functions may yet further include performing a second optimization of the predicted lane locations to the candidate lane locations to minimize correspondence error between the predicted lane locations and the candidate lane locations for optimal lane locations. The functions may still further include performing a third optimization of the predicted pedestrian-control lines to the candidate pedestrian-control lines to minimize correspondence error between the predicted pedestrian-control line locations and the candidate pedestrian-control line locations for optimal pedestrian-control line locations. The functions may still even further include based on one or more of the first optimization, the second optimization, and the third optimization, determining a second configuration of the intersection that may include the optimal curb locations, the optimal lane locations, and the optimal control line locations.

In a fourth aspect, another system is disclosed. In a first aspect, a method is provided. The system may include a means for receiving parameterized intersection data indicative of an intersection in a roadway of an environment. The parameterized intersection data may include a plurality of parameters that define the intersection in the environment. The system may also include a means for, based on the plurality of parameters, determining a first configuration of the intersection. The first configuration of the intersection may include one or more of predicted curb locations, predicted lane locations, or predicted pedestrian-control line locations. The system may additionally include a means for receiving map data based on a detection of the roadway in the environment by sensors on a vehicle that traverses the environment. The map data may include one or more of candidate curb locations of the intersection, candidate lane locations of the intersection, or candidate pedestrian-control lines of the intersection. The system may further include a means for performing a first optimization of the predicted curb locations to the candidate curb locations to minimize correspondence error between the predicted curb locations and the candidate curb locations for optimal curb locations. The system may yet further include a means for performing a second optimization of the predicted lane locations to the candidate lane locations to minimize correspondence error between the predicted lane locations and the candidate lane locations for optimal lane locations. The system may still further include a means for performing a third optimization of the predicted pedestrian-control lines to the candidate pedestrian-control lines to minimize correspondence error between the predicted pedestrian-control line locations and the candidate pedestrian-control line locations for optimal pedestrian-control line locations. The system may still even further include a means for based on one or more of the first optimization, the second optimization, and the third optimization, determining a second configuration of the intersection that may include the optimal curb locations, the optimal lane locations, and the optimal control line locations.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 4D and 4E conceptually illustrate an optimized intersection, according to an example embodiment.

DETAILED DESCRIPTION

Figure 1:
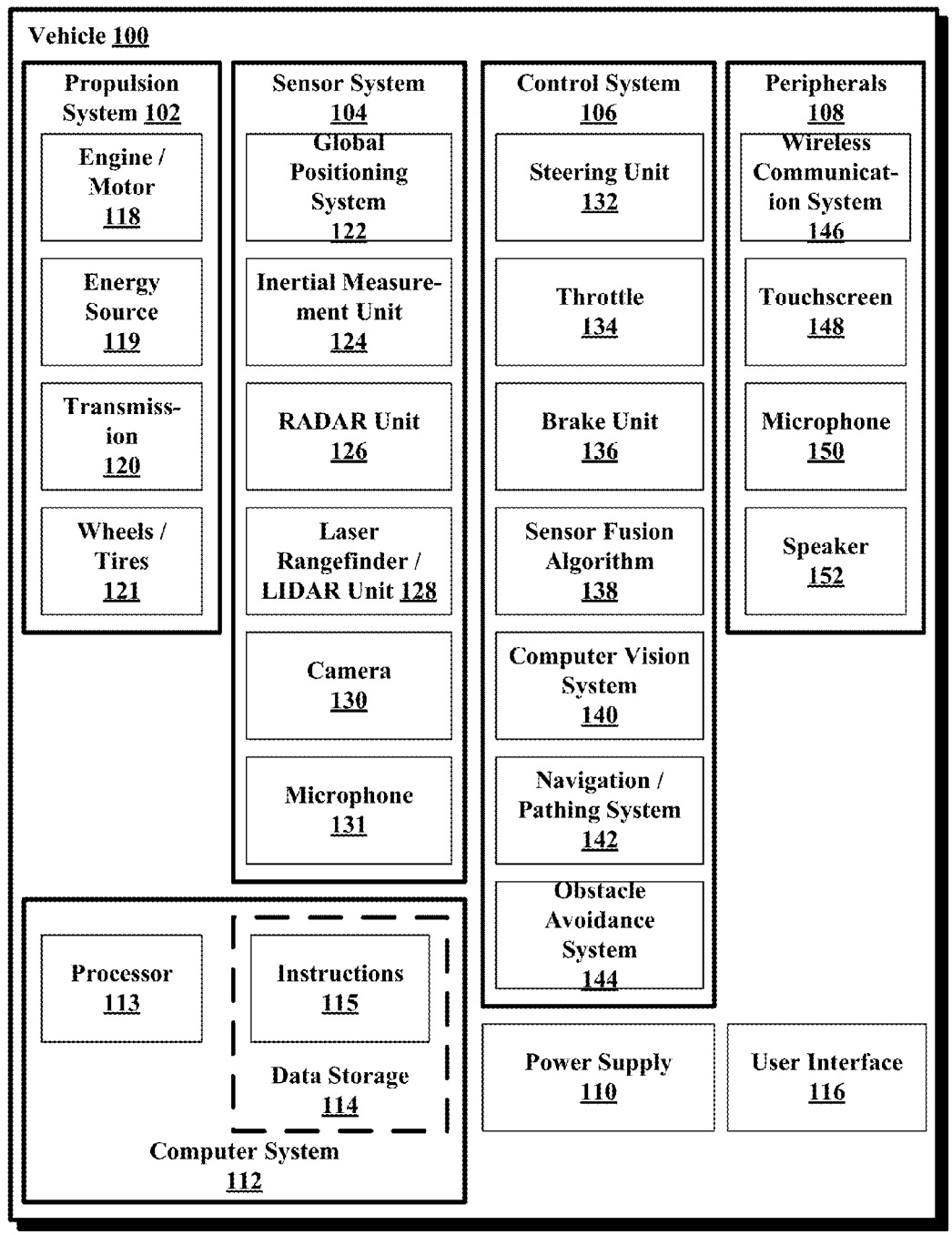
FIG. 1 illustrates a functional block diagram illustrating a vehicle, in accordance with an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

As noted above, autonomous vehicles may utilize detailed maps of the environment to help them operate. Building roadgraphs of an environment may be extensive and time consuming. In fact, the majority of the effort required to map a new environment may sometimes be the construction of the roadgraph. Similarly, because intersections may be complicated and varied in appearance, the majority of the time building a roadgraph may be the time spent mapping intersections. However, although, intersections can be complicated and varied in appearance, they differ in highly structured ways based on the rules of the road and roadway construction codes. Moreover, the highlevel structure of some intersections may be available via online datastores.

Within examples, disclosed are methods and systems that may utilize parameterized intersection models that can be optimized using high resolution image data such as intensity and elevation maps. For example, by comparing a shape of the intersection predicted by the parameterized data model with extracted curbs and lane boundaries from elevation and intensity maps, the intersection parameters can be optimized to match real intersection-features in the environment. Once the optimal intersection parameters have been found, roadgraph features describing the intersection may be extracted.

In an example embodiment, a method may involve receiving parameterized intersection data indicative of an intersection in a roadway of an environment. The parameterized intersection data may involve a plurality of parameters that define the intersection in the environment. Based on the plurality of parameters, a shape of the intersection may be determined. Upon determining the shape of the intersection, the shape of the intersection may be compared to map data that includes curb boundaries of the intersection and lane boundaries of the intersection. Based on the comparison, the shape of the intersection may be automatically adjusted. Using the adjusted shape of the intersection, a roadgraph of the intersection that includes the adjusted shape of the intersection may be determined.

Using the method described above, operators may automatically build or computing devices may be configured to build roadgraphs for many intersections in a short amount of time. Additionally, using this sort of automated approach to roadgraph creation may allow for the development of country sized maps at a reasonable cost.

Example systems will now be described in greater detail. Generally, an example system may be implemented in or may take the form of a computing device. However, an example system may also be implemented in or take the form of other devices or may be included within vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

FIG. 1 is a functional block diagram depicting a vehicle 100 according to an example embodiment. The vehicle 100 is configured to operate fully or partially in an autonomous mode, and thus may be referred to as an "autonomous vehicle." For example, a computer system 112 may control the vehicle 100 while in an autonomous mode via control instructions to a control system 106 for the vehicle 100. The computer system 112 may receive information from a sensor system 104, and base one or more control processes (such as the setting a heading so as to avoid a detected obstacle) upon the received information in an automated fashion.

The vehicle 100 may be fully autonomous or partially autonomous. In a partially autonomous vehicle some functions can optionally be manually controlled (e.g., by a driver) some or all of the time. Further, a partially autonomous vehicle may be configured to switch between a fully-manual operation mode and a partially-autonomous and/or a fully-autonomous operation mode.

The vehicle 100 may include various subsystems such as a propulsion system 102, a sensor system 104, a control system 106, one or more peripherals 108, as well as a power supply 110, a computer system 112, and a user interface 116. The vehicle 100 may include more or fewer subsystems and each subsystem may include multiple elements. Further, each of the subsystems and elements of vehicle 100 may be interconnected. Thus, one or more of the described functions of the vehicle 100 may be divided up into additional functional or physical components, or combined into fewer functional or physical components. In some further examples, additional functional and/or physical components may be added to the examples illustrated by FIG. 1.

The propulsion system 102 may include components operable to provide powered motion to the vehicle 100. Depending upon the embodiment, the propulsion system 102 may include an engine/motor 118, an energy source 119, a transmission 120, and wheels/tires 121. The engine/motor 118 could be any combination of an internal combustion engine, an electric motor, steam engine, Stirling engine, or other types of engines and/or motors. In some embodiments, the propulsion system 102 may include multiple types of engines and/or motors. For instance, a gas-electric hybrid vehicle may include a gasoline engine and an electric motor. Other examples are possible as well.

The energy source 119 may represent a source of energy that may, in full or in part, power the engine/motor 118. That is, the engine/motor 118 may be configured to convert the energy source 119 into mechanical energy to operate the transmission 120. Examples of energy sources 119 may include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 may also provide energy for other systems of the automobile 100.

The transmission 120 may include elements that are operable to transmit mechanical power from the engine/motor 118 to the wheels/tires 121. Such elements may include a gearbox, a clutch, a differential, a drive shaft, and/or axle(s), etc. The transmission 120 may include other elements as well. The drive shafts may include one or more axles that may be coupled to the one or more wheels/tires 121.

The wheels/tires 121 may be arranged to stably support the vehicle 100 while providing frictional traction with a surface, such as a road, upon which the vehicle 100 moves. Accordingly, the wheels/tires 121 of vehicle 100 may be configured in various formats, including a unicycle, bicycle/motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 may represent at least one wheel that is fixedly attached to the transmission 120 and at least one tire coupled to a rim of the wheel that could make contact with the driving surface. The wheels/tires 121 may include any combination of metal and rubber, or another combination of materials.

The sensor system 104 generally includes one or more sensors configured to detect information about the environment surrounding the vehicle 100. For example, the sensor system 104 may include a Global Positioning System (GPS) 122, an inertial measurement unit (IMU) 124, a RADAR unit 126, a laser rangefinder/LIDAR unit 128, a camera 130, and/or a microphone 131. The sensor system 104 may also include sensors configured to monitor internal systems of the vehicle 100 (e.g., $O_2$ monitor, fuel gauge, engine oil temperature, wheel speed sensors, etc.). One or more of the sensors included in the sensor system 104 may be configured to be actuated separately and/or collectively in order to modify a position and/or an orientation of the one or more sensors.

The GPS 122 may be any sensor configured to estimate a geographic location of the vehicle 100. To this end, GPS 122 may include a transceiver operable to provide information regarding the position of the vehicle 100 with respect to the Earth.

The IMU 124 may include any combination of sensors (e.g., accelerometers and gyroscopes) configured to sense position and orientation changes of the vehicle 100 based on inertial acceleration.

The RADAR unit 126 may represent a system that utilizes radio signals to sense objects within the local environment of the vehicle 100. In some embodiments, in addition to sensing the objects, the RADAR unit 126 may additionally be configured to sense the speed and/or heading of the objects.

Similarly, the laser rangefinder or LIDAR unit 128 may be any sensor configured to sense objects in the environment in which the vehicle 100 is located using lasers. Depending upon the embodiment, the laser rangefinder/LIDAR unit 128 could include one or more laser sources, a laser scanner, and one or more detectors, among other system components. The laser rangefinder/LIDAR unit 128 could be configured to operate in a coherent (e.g., using heterodyne detection) or an incoherent detection mode.

The camera 130 may include one or more devices configured to capture a plurality of images of the environment surrounding the vehicle 100. The camera 130 may be a still camera or a video camera. In some embodiments, the camera 130 may be mechanically movable such as by rotating and/or tilting a platform to which the camera is mounted. As such, a control process of the vehicle 100 may be implemented to control the movement of the camera 130.

The sensor system 104 may also include a microphone 131. The microphone 131 may be configured to capture sound from the environment surrounding the vehicle 100. In some cases, multiple microphones can be arranged as a microphone array, or possibly as multiple microphone arrays.

The control system 106 may be configured to control operation(s) of the vehicle 100 and its components. Accordingly, the control system 106 may include various elements include steering unit 132, throttle 134, brake unit 136, a sensor fusion algorithm 138, a computer vision system 140, a navigation/pathing system 142, and an obstacle avoidance system 144, etc.

The steering unit 132 may represent any combination of mechanisms that may be operable to adjust the heading of vehicle 100. For example, the steering unit 132 can adjust the axis (or axes) of one or more of the wheels/tires 121 so as to effect turning of the vehicle 100. The throttle 134 may be configured to control, for instance, the operating speed of the engine/motor 118 and, in turn, control the speed of the vehicle 100. The brake unit 136 may include any combination of mechanisms configured to decelerate the vehicle 100. The brake unit 136 may, for example, use friction to slow the wheels/tires 121. In other embodiments, the brake unit 136 inductively decelerates the wheels/tires 121 by a regenerative braking process to convert kinetic energy of the wheels/tires 121 to electric current. The brake unit 136 may take other forms as well.

The sensor fusion algorithm 138 may be an algorithm (or a computer program product storing an algorithm) configured to accept data from the sensor system 104 as an input. The data may include, for example, data representing information sensed at the sensors of the sensor system 104. The sensor fusion algorithm 138 may include, for instance, a Kalman filter, Bayesian network, or other algorithm. The sensor fusion algorithm 138 may provide various assessments based on the data from sensor system 104. Depending upon the embodiment, the assessments may include evaluations of individual objects and/or features in the environment of vehicle 100, evaluations of particular situations, and/or evaluations of possible impacts based on the particular situation. Other assessments are possible.

The computer vision system 140 may be any system operable to process and analyze images captured by camera 130 in order to identify objects and/or features in the environment of vehicle 100 that could include traffic signals, road way boundaries, other vehicles, pedestrians, and/or obstacles, etc. The computer vision system 140 may use an object recognition algorithm, a Structure From Motion (SFM) algorithm, video tracking, and other computer vision techniques. In some embodiments, the computer vision system 140 could be additionally configured to map an environment, track objects, estimate the speed of objects, etc.

The navigation and pathing system 142 may be any system configured to determine a driving path for the vehicle 100. For example, the navigation/pathing system 142 may determine a series of speeds and directional headings to effect movement of the vehicle 100 along a path that substantially avoids perceived obstacles while generally advancing the vehicle 100 along a roadway-based path leading to an ultimate destination, which may be set according to user inputs via the user interface 116, for example. The navigation and pathing system 142 may additionally be configured to update the driving path dynamically while the vehicle 100 is in operation. In some embodiments, the navigation and pathing system 142 could be configured to incorporate data from the sensor fusion algorithm 138, the GPS 122, and one or more predetermined maps so as to determine the driving path for vehicle 100.

The obstacle avoidance system 144 may represent a control system configured to identify, evaluate, and avoid or otherwise negotiate potential obstacles in the environment of the vehicle 100. For example, the obstacle avoidance system 144 may effect changes in the navigation of the vehicle 100 by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 may be configured such that a swerving maneuver is not undertaken when other sensor systems detect vehicles, construction barriers, other obstacles, etc. in the region adjacent the vehicle 100 that would be swerved into. In some embodiments, the obstacle avoidance system 144 may automatically select the maneuver that is both available and maximizes safety of occupants of the vehicle. For example, the obstacle avoidance system 144 may select an avoidance maneuver predicted to cause the least amount of acceleration in a passenger cabin of the vehicle 100.

The control system 106 may additionally or alternatively include components other than those shown and described.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. may include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of the vehicle 100, and convey information from the user indicated via the touchscreen 148 to the user interface 116. The touchscreen 148 can be configured to sense both touch positions and touch gestures from the finger of a user (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from an occupant of the vehicle 100. Similarly, the speaker 152 can be configured to output audio to the occupant of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle 100 that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as CDMA, EVDO, GSM/GPRS, and/or 4G cellular communication, such as WiMAX or LTE. Additionally or alternatively, the wireless communication system 146 can communicate with a wireless local area network (WLAN), for example, using WiFi. In some embodiments, the wireless communication system 146 could communicate directly with a device, for example, using an infrared link, Bluetooth, and/or ZigBee. The wireless communication system 146 can include one or more dedicated short range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

The power supply 110 may provide power to components of the vehicle 100, such as electronics in the peripherals 108, the computer system 112, the sensor system 104, etc. The power supply 110 can include a rechargeable lithium-ion or lead-acid battery for storing and discharging electrical energy to the various powered components, for example. In some embodiments, one or more banks of batteries may be configured to provide electrical power. In some embodiments, the power supply 110 and the energy source 119 can be implemented together, as in some all-electric cars.

Many or all of the functions of the vehicle 100 may be controlled via the computer system 112 that receives inputs from the sensor system 104, the peripherals 108, etc., and communicates appropriate control signals to the propulsion system 102, the control system 106, the peripherals 108, etc. to effect automatic operation of the vehicle 100 based on its surroundings. The computer system 112 may include at least one processor 113 (which could include at least one microprocessor) that executes instructions 115 stored in a non-transitory computer readable medium, such as the data storage 114. The computer system 112 may also represent a plurality of computing devices that may serve to control individual components or subsystems of the vehicle 100 in a distributed fashion.

In some embodiments, data storage 114 may contain instructions 115 (e.g., program logic) executable by the processor 113 to execute various automobile functions, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 at during the operation of the vehicle 100 in the autonomous, semi-autonomous, and/or manual modes.

The vehicle 100, and associated computer system 112, provides information to and/or receives input from, a user of the vehicle 100, such as an occupant in a passenger cabin of the vehicle 100. Accordingly, the vehicle 100 may include a user interface 116 for providing information to or receiving input from a user of vehicle 100. The user interface 116 may control or enable control of content and/or the layout of interactive images that could be displayed on the touchscreen 148. Further, the user interface 116 could include one or more input/output devices within the set of peripherals 108, such as the wireless communication system 146, the touchscreen 148, the microphone 150, and the speaker 152.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 may utilize input from the control system 106 to control the steering unit 132 to avoid an obstacle detected by the sensor system 104 and the obstacle avoidance system 144. The computer system 112 may be configured to control many aspects of the vehicle 100 and its subsystems. Generally, however, provisions are made for manually overriding automated controller-driven operation, such as in the event of an emergency, or merely in response to a user-activated override, etc.

The components of the vehicle 100 described herein may be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in the data storage 114, and/or by other techniques.

Although FIG. 1 shows various components of vehicle 100, i.e., wireless communication system 146, computer system 112, data storage 114, and user interface 116, as being integrated into the vehicle 100, one or more of these components could be mounted or associated separately from the vehicle 100. For example, data storage 114 could, in part or in full, exist separate from the vehicle 100. Thus, the vehicle 100 could be provided in the form of device elements that may be located separately or together. The device elements that make up vehicle 100 may generally be communicatively coupled together in a wired and/or wireless fashion.

Figure 2:
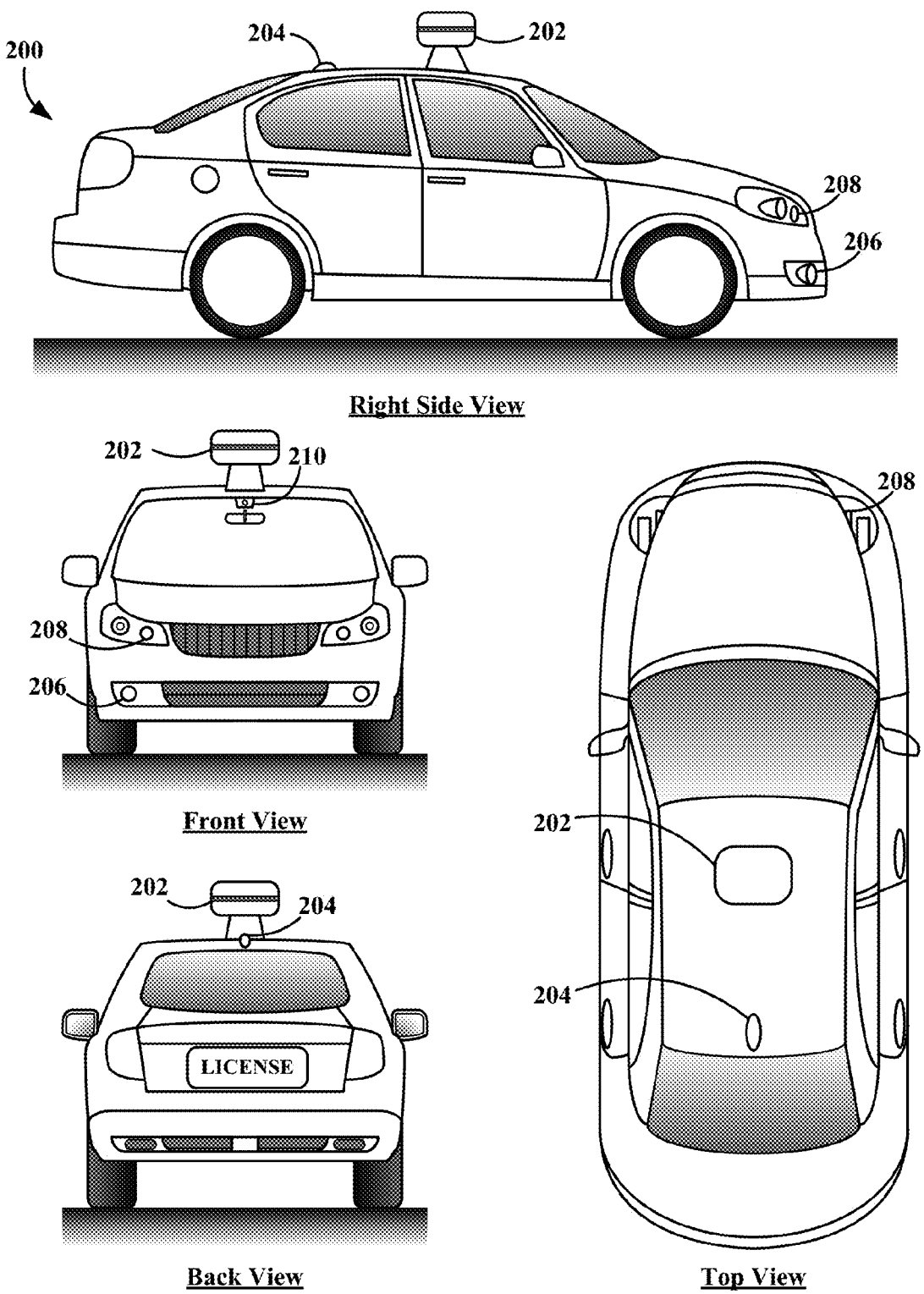
FIG. 2 illustrates a vehicle, in accordance with an example embodiment.

FIG. 2 depicts an example vehicle 200 that can include all or most of the functions described in connection with the vehicle 100 in reference to FIG. 1. Although example vehicle 200 is illustrated in FIG. 2 as a four-wheel sedan-type car for illustrative purposes, the present disclosure is not so limited. For instance, example vehicle 200 can represent any type of vehicle mentioned herein.

Example vehicle 200 includes a sensor unit 202, a wireless communication system 204, a LIDAR unit 206, a laser rangefinder unit 208, and a camera 210. Furthermore, example vehicle 200 may include any of the components described in connection with vehicle 100 of FIG. 1.

The sensor unit 202 is mounted atop example vehicle 200 and includes one or more sensors configured to detect information about an environment surrounding example vehicle 200, and output indications of the information. For example, the sensor unit 202 may include any combination of cameras, RADARs, LIDARs, range finders, and acoustic sensors. The sensor unit 202 may include one or more movable mounts that may be operable to adjust the orientation of one or more sensors in the sensor unit 202. In one embodiment, the movable mount may include a rotating platform that may scan sensors so as to obtain information from each direction around example vehicle 200. In another embodiment, the movable mount of the sensor unit 202 may be moveable in a scanning fashion within a particular range of angles and/or azimuths. The sensor unit 202 may be mounted atop the roof of a car, for instance, however other mounting locations are possible. Additionally, the sensors of the sensor unit 202 may be distributed in different locations and need not be collocated in a single location. Some possible sensor types and mounting locations include the LIDAR unit 206 and laser rangefinder unit 208. Furthermore, each sensor of the sensor unit 202 may be configured to be moved or scanned independently of other sensors of the sensor unit 202.

The wireless communication system 204 may be located on a roof of example vehicle 200 as depicted in FIG. 2. Alternatively, the wireless communication system 204 may be located, fully or in part, elsewhere. The wireless communication system 204 may include wireless transmitters and receivers that may be configured to communicate with devices external or internal to example vehicle 200. Specifically, the wireless communication system 204 may include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 may be a photo-sensitive instrument, such as a still camera, a video camera, etc., that is configured to capture a plurality of images of the environment of example vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 may provide range information by using a structured light technique in which example vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, example vehicle 200 may determine the distance to the points on the object. The predetermined light pattern may include infrared light, or radiation at other suitable wavelengths for such measurements.

The camera 210 may be mounted inside a front windshield of example vehicle 200. Specifically, the camera 210 may be situated to capture images from a forward-looking view with respect to the orientation of example vehicle 200. Other mounting locations and viewing angles of the camera 210 may also be used, either inside or outside example vehicle 200.

The camera 210 can have associated optics operable to provide an adjustable field of view. Further, the camera 210 may be mounted to example vehicle 200 with a movable mount to vary a pointing angle of the camera 210, such as a via a pan/tilt mechanism.

Figure 3:
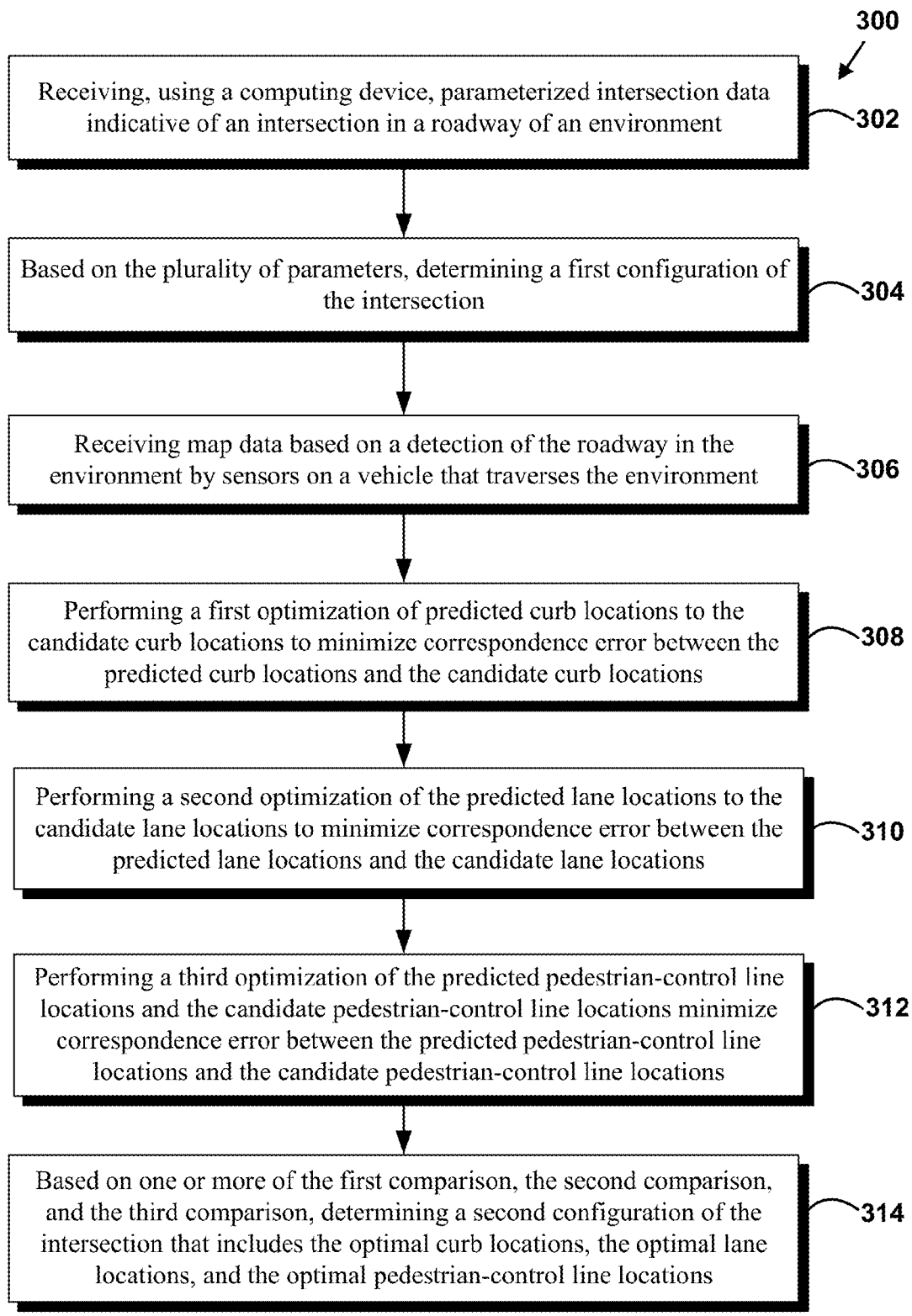
FIG. 3 illustrates a block diagram of a method, in accordance with an example embodiment.

In FIG. 3, a method 300 is provided that may allow for basic intersection models to be optimized with high resolution image data such as intensity maps or elevation maps, in accordance with an example embodiment. The vehicle described in this method may be vehicle 100 and/or vehicle 200 as illustrated and described in reference to FIGS. 1 and 2, respectively, or components of the vehicle 100 or vehicle 200. For example, the processes described herein may be carried out by a LIDAR unit 128 mounted to an autonomous vehicle (e.g., vehicle 200) in communication with computer system 112, and/or sensor fusion algorithm 138. In some examples, the processes described in this method may be carried out by a computer system external to the vehicle, and upon completion any resulting data (e.g., a roadgraph) may be passed to the vehicle.

Furthermore, it is noted that the functionality described in connection with the flowcharts described herein can be implemented as special-function and/or configured general-function hardware modules, portions of program code executed by a processor (e.g., the processor 113 in computer system 112) for achieving specific logical functions, determinations, and/or steps described in connection with the flowchart shown in FIG. 3. Where used, program code can be stored on any type of computer-readable medium (e.g., computer-readable storage medium or non-transitory media, such as the data storage 114 described above with respect to computer system 112 and/or a computer program product 500 described below), for example, such as a storage device including a disk or hard drive.

In addition, each block of the flowchart shown in FIG. 3 may represent circuitry that is wired to perform the specific logical functions in the process. Unless specifically indicated, functions in the flowchart shown in FIG. 3 may be executed out of order from that shown or discussed, including substantially concurrent execution of separately described functions, or even in reverse order in some examples, depending on the functionality involved, so long as the overall functionality of the described method is maintained.

Initially, at block 302, method 300 of FIG. 3 involves receiving, using a computing device, parameterized intersection data indicative of an intersection in a roadway of an environment. The intersection may be any intersection in a roadway of an environment and the structure of the intersection may take various forms. For example, the structure of the intersection may vary along many different axes. Additionally, the intersection may vary in the number of "ways" into and out of the intersection (e.g., a 3-way intersection, a 4-way intersection, etc). Further, each direction of the intersection may be one-way or two-way, and each way may vary in number of lanes, including bike and parking lanes. Each direction may also include a median or not. The intersections may also include turn islands that may, for example, block off dedicated turn lanes.

In addition to varying in form, the intersection may vary in structure and various types of intersection structures may be possible. For example, the intersection may be a non-drivable intersection, a degenerate intersection, a non-public intersection, or a special case intersection, to name a few. Non-drivable intersections may include intersections that may include segments not drivable by vehicles such as footpaths and railroad tracks. Degenerate intersections may include intersections with less than three input or output directions. Non-public intersections may include intersections in private developments, trailer parks, parking lots, etc. Special case intersections may include, for example, on-ramps, off-ramps, lane splits, and parking lot entrances.

Figure 4A:
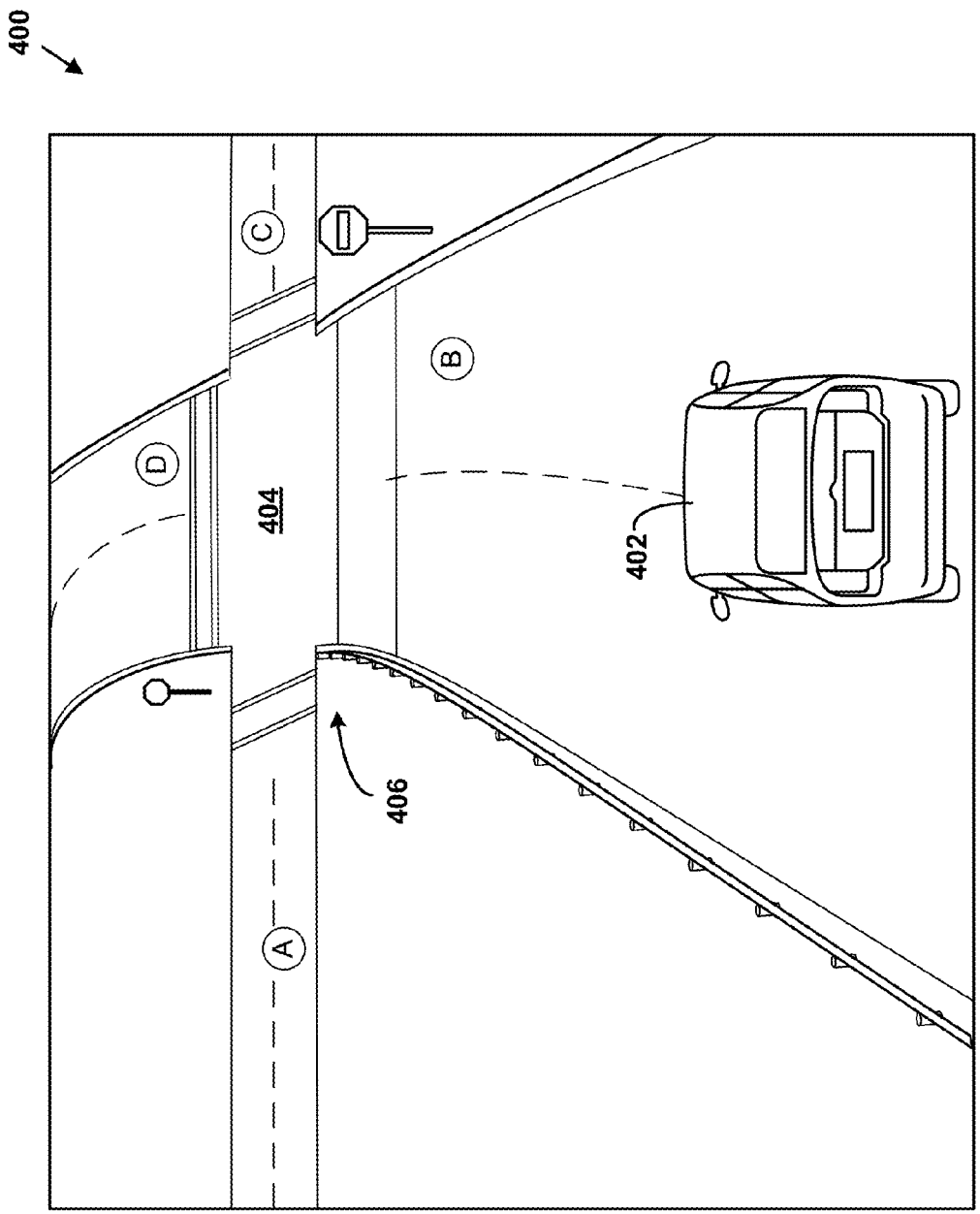
FIG. 4A illustrates an example of an intersection in an environment, according to an example embodiment.

The environment of the intersection may be any environment in which an intersection is present in a roadway of the environment such as environment 400 of FIG. 4A. As shown in FIG. 4A, vehicle 402 may be operating in an environment 400 that includes vehicle 402, and a four-way intersection 404 with ways: A, B, C, and D. The intersection may be in a roadway 406. As shown each way may include two lanes, each lane having a direction opposite the other lane in the way. Further, intersection 404 may include no medians or turn islands. Accordingly, intersection 404 may be defined as a simple intersection.

The intersection in FIG. 4A is not intended to be limiting. Vehicle 402 may operate on other roadways with a different intersection similar to intersection 404; the different intersection may be structurally the same as or similar to any of the intersection structures noted above. As previously noted, the vehicle may be the vehicle described in reference to FIGS. 1 and 2 and may be configured to operate in an autonomous mode in environment 400.

The parameterized intersection data may include a plurality of parameters that define or describe, among other things, the geometry of the intersection in the roadway of the environment. Similar to metadata, the parameters may include a variety of parameters that each may describe a different aspect of the intersection. Such examples may include, for example, parameters that defines legs (or ways) of the intersection, parameters that define lanes of the intersection, parameters that define medians in the intersection, parameters that define lane connections of the intersection, and parameters that define stop signs associated with the intersection. Within the context of this disclosure, a lane connection may define paths between lanes in the intersection.

As noted above the parameters may describe or define a variety of types of information about geometry of the intersection. For example, the leg parameter may describe the number and approximate geometry of the legs of the intersection. The leg parameters may also describe an estimate of the width of the road surface, which can be used to predict the locations of curbs. The lane parameters may describe information regarding the lanes in the intersection such as the number of lanes, lane types, and lane order from left to right. Lane types may include, for example, normal, passing, left turn, right turn, bike, parking, exits, and entrances. The parameters describing lane connections may describe all of the valid paths between lanes in an intersection. In other words, the lane connections parameters may also describe the geometry of all the turns possible in the intersection.

Note, the parameters listed above are examples and are not intended to be an exhaustive list or limiting. Other parameters may be included in the plurality of parameters. For example, parameters may include information regarding the placement of stop signs in the intersection. Any information that describes basic geometry of the intersection such as the information noted above, for example, may be defined using a parameter. Taken together, the parameters may generally describe the geometry of the intersection at a high level.

Accordingly, returning to the example illustrated in FIG. 4A, a parameterized model may be received that describes the geometry of intersection 404. For example, the parameterized model may include parameters that describe each way A, B, C, and D, curbs of the intersection 404 and roadway 406, and the lanes associated with each way. Additionally, the parameterized model may describe the centerlines of each way and the width of each way. Other information may be included in the parameterized model.

At block 304, method 300 includes based on the plurality of parameters, determining a first configuration of the intersection. The first configuration of the intersection may include one or more of predicted curb locations, predicted-lane locations, or predicted pedestrian-control line locations in the intersection. The predicted curb locations, predicted-lane locations, or predicted pedestrian-control line locations may be determined based on the basic information provided by the plurality of parameters.

To determine the first configuration of the intersection, the computing device, may utilize the information defined by the parameters to predict the location of any curbs of the intersection, lanes of the intersection, or pedestrian-control lines of the intersection (pedestrian-control lines may include, for example, any stop lines or crosswalks that may be present in the intersection).

For example, to predict curb locations, the computing device may leverage information including the rules of the road and construction codes. For instance, recognizing that simple intersections contain no medians or turn islands, it may be determined that the only curbs of a simple intersection may be the sides of the road. Additionally, the number of curb features in a simple intersection may be equal to the number of legs of the intersection; if the legs of the intersection are sorted in counter-clockwise order, each curb may span between the i-th and i+1-th leg. Since each leg has a centerline and two half-widths (the distances from the centerline to the left and right sides of the road), curb location may be predicted by: (1) offsetting the i-th and i+1-th leg centerlines to the right (in the perpendicular direction) by the appropriate half-widths; (2) finding the intersection point between the two offset curves, and backing off by a given radius along each offset curve (i.e., back-off points); and (3) constructing a spline that follows the ith offset curve up to the first back-off point, follows the i+1th offset curve after the second back-off point, and interpolates in between the back-off points.

As alluded to above, the information required for the curb prediction process may be obtained from the parameters that define the intersection. More specifically, for curb prediction, the number of legs, leg geometry, and leg half widths can all be seeded from the parameterized data that describes the intersection, and the curb radius may be seeded with a typical value (e.g., 10 m).

Predicting lane location may be similar to predicting curb location. First, the number and type of lanes for each intersection lane may be extracted from the parameterized data indicative of the intersection. Each lane may be given a default width based on its type (e.g., 6 ft for bike lanes, 12 feet for everything else). The lane widths may then be normalized in attempt to cause a total width of all legs of a lane to be equal to the width of the road according to the curbs.

Predicting pedestrian control lines (i.e., stop lines or cross walks) may also be performed based on data obtained from the parameterized data. For example, the computing device may use the information from the parameters describing the center of the lane, and locations of the lanes. Because stop lines may be designated by a single solid line across a lane in an intersection, or other time may be indicated by the boundary of a painted crosswalk, stop lines and crosswalks may both identified by walking along lanes of the intersection, starting from the center. In so doing, the computing device may attempt to find a single line that crosses one direction of the road (stop line) or a pair of lines (crosswalk) that cross the entire intersection leg. Accordingly, the information obtained from the parameter regarding the center etc. is necessary.

In other examples, the parameterized model may be used to predict the location of stop signs in the intersection. For example, the parameterized data may include a parameter that indicates whether and where the legs of the intersection are terminated. Based on this information, the location of stop signs may be predicted.

It should be noted that the predictions made (e.g., curb locations) at block 304 using the methods described above are not intended to be limiting. Other predictions may be made and other methods may be used to determine the first configuration of the intersection. Generally, any method may be used, wither now known or later developed, that may allow a basic configuration of the intersection to be determined.

Accordingly, at block 304, a first configuration of the intersection may be determined based on the parameters received at block 302. The determination may be made, for example, using a computer system similar to or the same as computer system 112 as described in FIG. 1 and may involve processing the parameters using the methods described above to generate the first configuration. In general, the configuration may be generated employing any image data processing methods or systems that are now known or may be later developed.

Figure 4B:
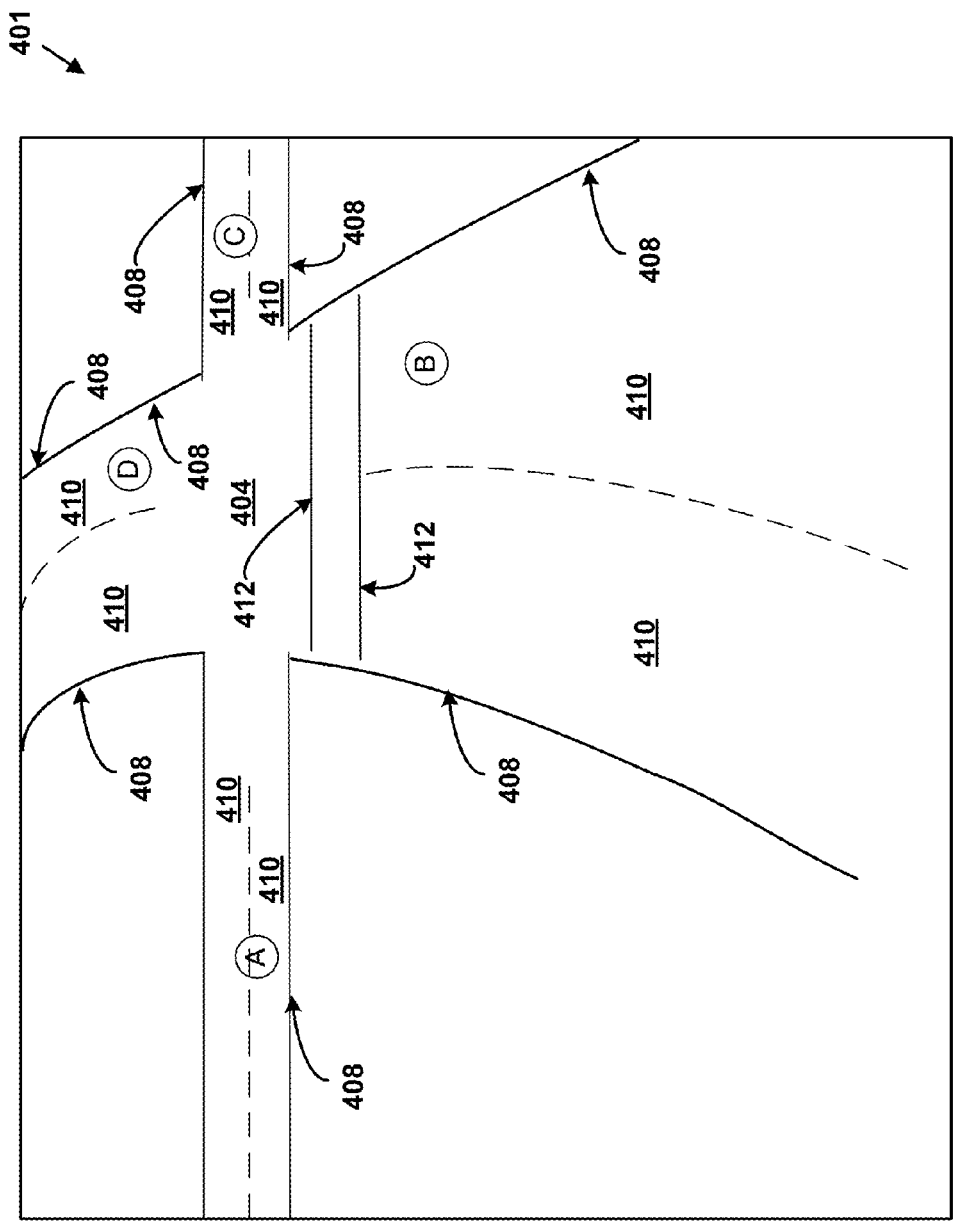
FIG. 4B illustrates an example predicted intersection, according to an example embodiment.

For example, as shown in FIG. 4B, the first configuration 401 may include predicted curb locations 408, predicted lane locations 410, and predicted control lines locations 412. Other information may be included in the first configuration as well.

Note the first configuration may not include all aspects of the intersection as defined by the parameters. Generally, the aspects of the determined configuration may include the aspects that are determined to be relevant to the vehicle. For example, some circumstances may warrant only a basic configuration of the intersection, while others may warrant a more detailed configuration. For instance, the intersection in FIG. 4A includes multiple stop signs and multiple pedestrian-control lines. However, these aspects of the intersection have not been incorporated in the determined configuration (i.e., the example configuration shown in FIG. 4B).

Once the first configuration has been determined, at block 306, method 300 involves receiving map data based on a detection of the roadway in the environment by sensors on a vehicle that traverses the environment. The sensors may be any of the sensors discussed above with regard to FIGS. 1 and 2, and the vehicle may be the same as or similar to that of vehicle 100 or vehicle 200, for example. In some examples, the vehicle that traversed the environment may be a vehicle that is currently operating in the environment (e.g., vehicle 402) of FIG. 4A, and in other examples the vehicle may be a vehicle that previously traversed the environment and previously detected the intersection in the roadway. In further examples, the map data may be a combination of data received from both a vehicle currently detecting the environment and a vehicle that previously detected the environment.

In some examples, the map data may take the form of elevation maps or intensity maps. However, intensity maps and elevation maps are intended to be examples only and the map data may take the form of any high-resolution image data so long as the image data is more detailed that the configuration determined at block 304. The map data may include candidate curb locations of the intersection, candidate lane locations of the intersection, or candidate pedestrian-control lines of the intersection. Generally, the candidate information in the map data may estimate where aspects of the intersection actually are in the environment as detected when a vehicle traversed the environment. In other words, the candidate curb locations may describe where the potential curbs of the intersection are in the environment as detected; the candidate lane locations may describe where the potential lanes of the intersection are in the environment as detected; and the candidate pedestrian-control lines may describe where the potential control lines of the intersection are in the environment as detected. Other candidate features may be included in the map data other than the features noted above. For example, in some instances, the map data may include candidate stop signs.

Figure 4C:
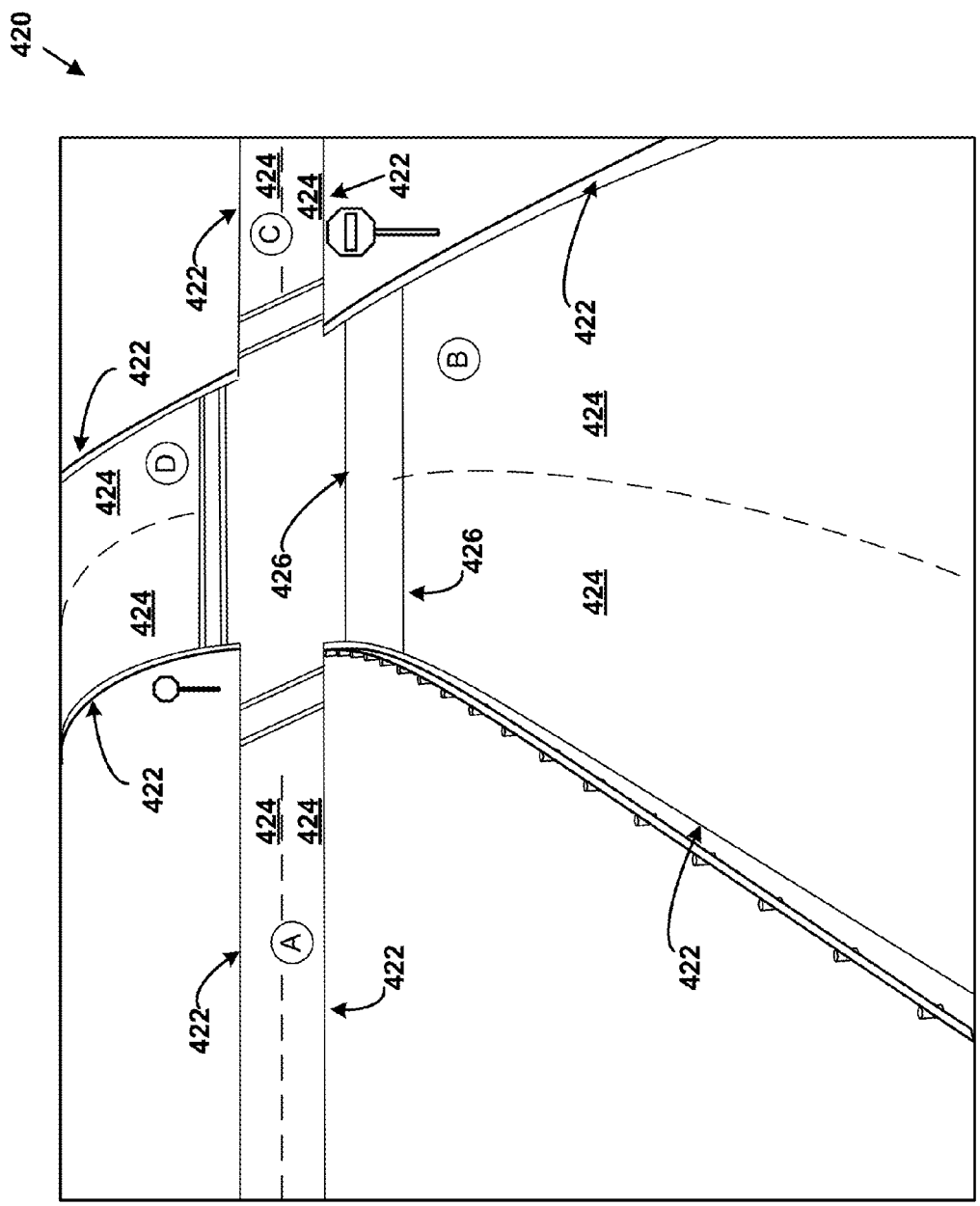
FIG. 4C illustrates an example candidate intersection, according to an example embodiment.

Returning to the example of FIG. 4A, a vehicle may traverse environment 400 and obtain map data 420 as shown in FIG. 4C. The map data 420 may include candidate curb locations 422, candidate lane locations 424, and candidate pedestrian-control lines 426.

Once the map data has been received, at block 308, method 300 involves performing a first optimization of predicted curb locations to the candidate curb locations to minimize correspondence error between the predicted curb locations and the candidate curb locations. And at block 310, method 300 involves performing a second optimization of the predicted lane locations to the candidate lane locations to minimize correspondence error between the predicted lane locations and the candidate lane locations. And at block 312, method 300 involves performing a third optimization of the predicted pedestrian-control line locations and the candidate pedestrian-control line locations.

Optimizing the predicted curb locations to the candidate curb locations to minimize correspondence error between the predicted curb locations and the candidate curb locations may include extracting curb features from the map data surrounding the intersection. In other words, the curb features may be extracted from the intensity maps or the elevation data. In one example, extracting the curb features may include performing edge detection on the surrounding elevation imagery; computing the gradient of the elevation map in x and y; performing non-maxima suppression (i.e., edge thinning); chaining nearby edges together; suppressing edge chains with gradients that do not correspond with curb sized objects; and suppress edges that do not have approximately a lane width of free space to their left. However this is only one method for edge detection and other means are possible. Any edge detection method may be used that is known in the art.

Once the edge detection has been performed, a potential function may be defined over the plurality of parameters that define the intersection measuring the total distance between the predicted curb locations and the candidate curb features extracted from the elevation data. The template parameters can be optimized, for example, by applying any reasonable non-linear gradient descent algorithm to the potential function. In other words, optimizing the predicted curb locations to the candidate curb locations to minimize correspondence error between the predicted curb locations and the candidate curb locations may include minimizing a distance between the predicted curb locations and the candidate curb locations by varying the plurality of parameters.

Optimizing of the predicted lane locations to the candidate lane locations to minimize correspondence error between the predicted lane locations and the candidate lane locations may be performed in a similar manner to that of the curb optimization explained above. Candidate lane boundaries may be extracted from the map data (e.g., intensity imagery) and a potential function may be defined over the plurality of parameters that define the intersection measuring the total distance between the predicted lane locations and the candidate lane features extracted from the intensity imagery. The potential function may penalize distance between detected boundaries and the predicted lane boundaries. Stated differently, optimizing the predicted lane locations to the candidate lane locations may include minimizing a distance between the predicted lane locations and the candidate lane locations by varying the plurality of parameters.

In other examples, the predicted pedestrian-control lines may be optimized to the candidate pedestrian-control lines as well. For example, as noted above, when predicting pedestrian-control lines the detector attempts to find a single line that may cross one direction of the road (stop line) or a pair of lines (crosswalk) that cross the entire intersection leg. After making the prediction, the width and angle of crosswalks may be further optimized to match the map data imagery. Once a stop line or crosswalk has been optimized, in some examples, the number of bright points beneath the feature may checked, which may help eliminate false positive detections.

In general, optimizing the predicted lane locations, curb locations, and pedestrian-control lines may include adjusting a subset of the plurality of parameters of the parameterized data that describes the respective predicted aspects in a manner such that the difference between the predicted aspects and the candidate aspects remains at a minimum. In some examples, optimizing the predicted aspects and the candidate aspects may include superimposing the predicted aspects on the candidate aspects and aligning the two. Generally, any data processing methods may be used to align and optimize the intersection aspects.

Figure 4D:
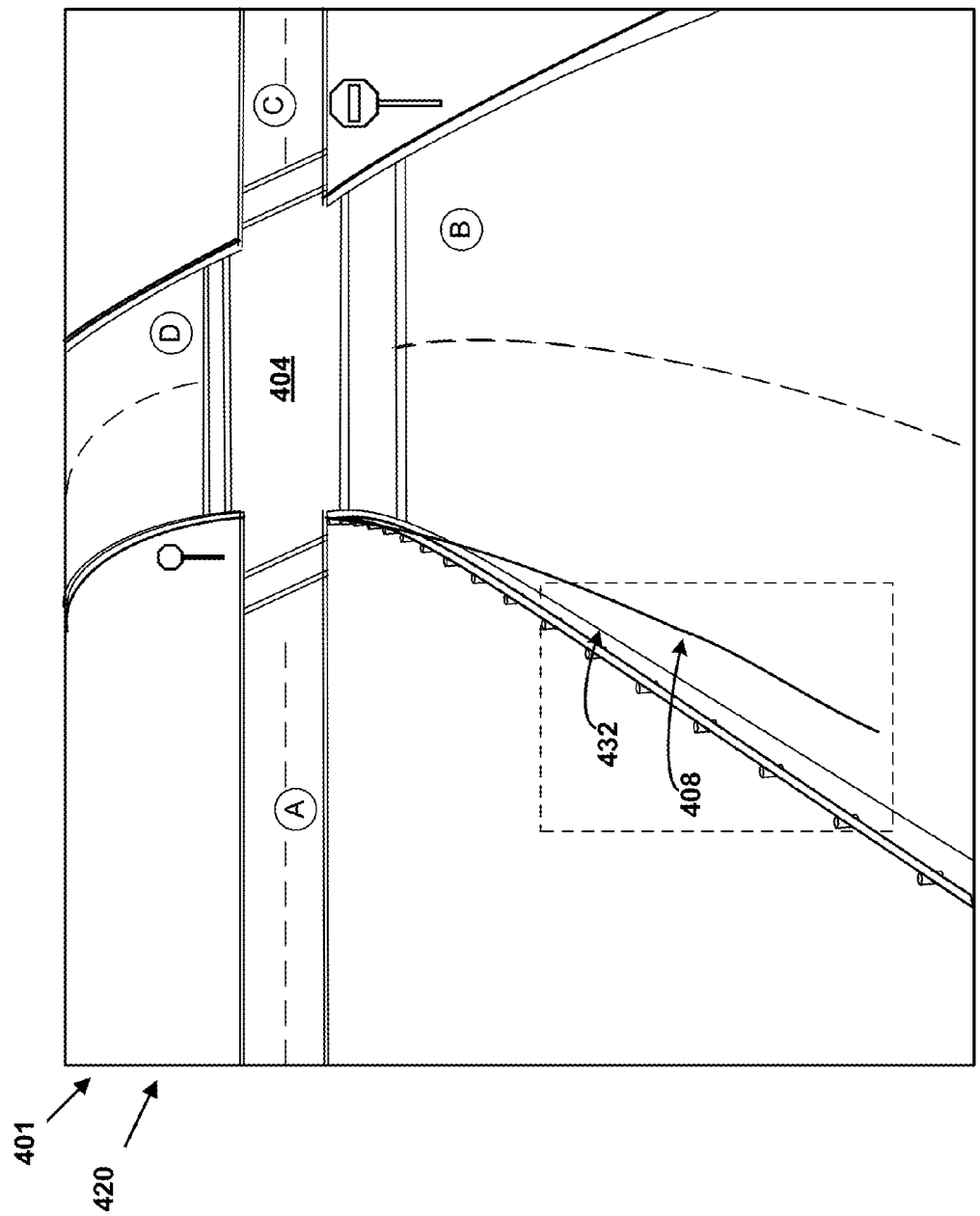

FIGS. 4D and 4E illustrates an example of optimizing the predicted intersection 401 shown in FIG. 4B and the detected, candidate intersection 420 shown FIG. 4C. In FIG. 4D, the predicted intersection 401 is superimposed on candidate intersection 420. As shown, the predicted intersection 401 and the candidate intersection 420 are slightly miss-aligned. For example, shown in the dotted box, the curb 408 as predicted is slightly different from the detected (or candidate) curb 432 in intersection way B. Using the optimization methods described above, aspects of the predicted intersection 401 and the candidate intersection 420 can be optimized, shown as optimized intersection 430 in FIG. 4E. As shown in FIG. 4E, the predicted curb 408 as predicted is now more in line with the detected (or candidate) curb 432. This optimization may be performed for all of the aspects of the intersection.

At block 314, method 300 may involve, based on one or more of the first comparison, the second comparison, and the third comparison, determining a second configuration of the intersection that includes the optimal curb locations, the optimal lane locations, and the optimal control line locations.

To determine the second configuration, a computer may process the first comparison, the second comparison, and the third comparison using a computer in the same or similar manner as described above with reference to block 304. Additionally, the second configuration may be used to update the parameters in a manner that they more accurately describe the intersection in the environment.

In some examples, once the second configuration has been determined, a roadgraph of the intersection may be generated. The roadgraph may be generated for example, based on the optimal curb locations, the optimal lane locations, and the optimal pedestrian-control line locations. Additionally, in some examples, the roadgraph may include a symbolic representation of the second configuration.

Once generated the roadgraph may be provided to a vehicle that may operate in the environment autonomously. Based on the features in the roadgraph the vehicle may be provided instructions to navigate through the intersection accordingly.

Example methods, such as method 300 of FIG. 3 may be carried out in whole or in part by the vehicle and its subsystems. Accordingly, example methods could be described by way of example herein as being implemented by the vehicle. However, it should be understood that an example method may be implemented in whole or in part by other computing devices. For example, an example method may be implemented in whole or in part by a server system, which receives data from a device such as those associated with the vehicle. Other examples of computing devices or combinations of computing devices that can implement an example method are possible.

Figure 5:
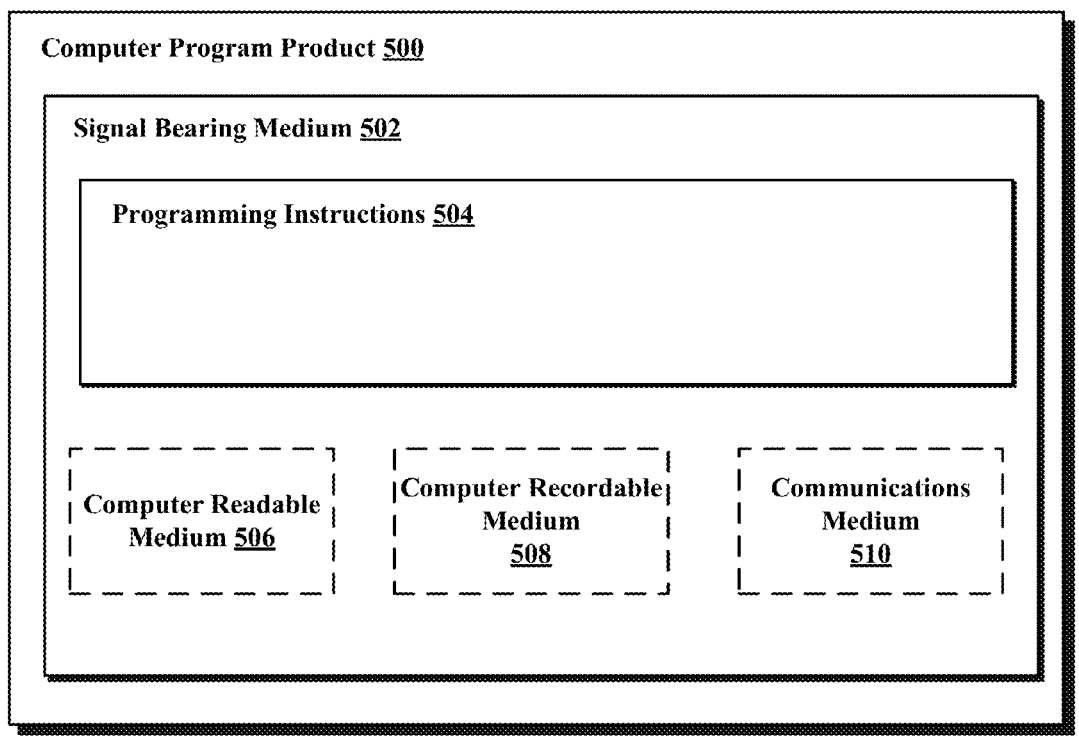
FIG. 5 illustrates a schematic diagram of a computer program product, according to an example embodiment.

In some embodiments, the techniques disclosed herein may be implemented as computer program instructions encoded on a non-transitory computer-readable storage media in a machine-readable format, or on other non-transitory media or articles of manufacture (e.g., the instructions 115 stored on the data storage 114 of the computer system 112 of the vehicle 100). FIG. 5 is a schematic illustrating a conceptual partial view of an example computer program product that includes a computer program for executing a computer process on a computing device, arranged according to at least some embodiments presented herein.

In one embodiment, the example computer program product 500 is provided using a signal bearing medium 502. The signal bearing medium 502 may include one or more programming instructions 504 that, when executed by one or more processors may provide functionality or portions of the functionality described herein. In some examples, the signal bearing medium 502 can be a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer system 112 of FIG. 1 may be configured to provide various operations, functions, or actions in response to the programming instructions 504 conveyed to the computer system 112 by one or more of the computer readable medium 506, the computer recordable medium 508, and/or the communications medium 510.

The non-transitory computer readable medium could also be distributed among multiple data storage elements, which could be remotely located from each other. The computing device that executes some or all of the stored instructions could be a vehicle, such as the example vehicle 200 illustrated in FIG. 2. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments are possible. The various aspects and embodiments disclosed herein are for purposes of illustration and are not intended to be limiting, with the true scope being indicated by the following claims.

We claim:

1. A method comprising:
   based on a plurality of parameters that define an intersection in a roadway of an environment, determining, by a computing device, a first configuration of the intersection, wherein the first configuration of the intersection includes one or more of predicted locations of sides of the intersection and predicted pedestrian-control line locations of the intersection;
   receiving map data based on a detection of the roadway in the environment by sensors on a vehicle that traverses the environment, wherein the map data includes one or more of candidate locations of sides of the intersection and candidate pedestrian-control line locations of the intersection;
   performing a first optimization of the predicted locations of sides of the intersection to the candidate locations of sides of the intersection to minimize correspondence error between the predicted locations of sides of the intersection and the candidate locations of sides of the intersection for optimal locations of sides of the intersection;
   performing a second optimization of the predicted pedestrian-control line locations to the candidate pedestrian-control line locations to minimize correspondence error between the predicted pedestrian-control line locations and the candidate pedestrian-control line locations for optimal pedestrian-control line locations;
   based on one or more of the first optimization and the second optimization, determining a second configuration of the intersection that includes the optimal locations of sides of the intersection and the optimal pedestrian-control line locations; and
   based on the second configuration of the intersection, navigating an autonomous vehicle through the intersection.

2. The method of claim 1, further comprising determining a roadgraph of the intersection that includes a symbolic representation of the second configuration of the intersection.

3. The method of claim 2, further comprising providing the roadgraph to the autonomous vehicle.

4. The method of claim 2, further comprising, based on the roadgraph, providing instructions to control the autonomous vehicle, wherein navigating the autonomous vehicle through the intersection is further based on the instructions.

5. The method of claim 1, wherein the plurality of parameters include one or more of parameters that define legs of the intersection, parameters that define lanes of the intersection, parameters that define medians in the intersection, and parameters that define lane connections of the intersection, wherein the lane connections define paths between lanes in the intersection.

6. The method of claim 1, wherein the map data includes at least one of an image map, an intensity map, or an elevation map.

7. The method of claim 1, wherein performing the first optimization of the predicted locations of sides of the intersection to the candidate locations of sides of the intersection to minimize correspondence error between the predicted locations of sides of the intersection and the candidate locations of sides of the intersection for the optimal locations of sides of the intersection comprises minimizing a distance between the predicted locations of sides of the intersection and the candidate locations of sides of the intersection by varying the plurality of parameters, and
   wherein performing the second optimization of the predicted pedestrian-control line locations to the candidate pedestrian-control line locations to minimize correspondence error between the predicted pedestrian-control line locations and the candidate pedestrian-control line locations for the optimal pedestrian-control line locations comprises minimizing a distance between the predicted pedestrian-control line locations and the candidate pedestrian-control line locations by varying the plurality of parameters.

8. The method of claim 1, wherein the first configuration of the intersection further includes predicted lane locations, and wherein the map data further includes candidate lane locations of the intersection, the method further comprising:
   performing a third optimization of the predicted lane locations to the candidate lane locations to minimize correspondence error between the predicted lane locations and the candidate lane locations for optimal lane locations,
   wherein determining the second configuration of the intersection is further based on the third optimization, and
   wherein the second configuration further includes the optimal lane locations.

9. The method of claim 8, wherein performing the third optimization of the predicted lane locations to the candidate lane locations to minimize correspondence error between the predicted lane locations and the candidate lane locations for the optimal lane locations comprises minimizing a distance between the predicted lane locations and the candidate lane locations by varying the plurality of parameters.

10. The method of claim 1, wherein pedestrian-control line locations include locations of at least one of a stop line or a crosswalk.

11. The method of claim 1, wherein locations of sides of the intersection include locations of at least one of: a curb and an edge of a surface of the intersection.

12. A system comprising:
   sensors on one or more vehicles that are configured to traverse an environment; and
   a computer system configured to:

based on a plurality of parameters that define an intersection in a roadway of an environment, determine a first configuration of the intersection, wherein the first configuration of the intersection includes one or more of predicted locations of sides of the intersection and predicted pedestrian-control line locations of the intersection;

receive map data based on a detection of the roadway in the environment by the sensors on the one or more vehicles that traverse the environment, wherein the map data includes one or more of candidate locations of sides of the intersection and candidate pedestrian-control line locations of the intersection;

perform a first optimization of the predicted locations of sides of the intersection to the candidate locations of sides of the intersection to minimize correspondence error between the predicted locations of sides of the intersection and the candidate locations of sides of the intersection for optimal locations of sides of the intersection;

perform a second optimization of the predicted lane pedestrian-control line locations to the candidate pedestrian-control line locations to minimize correspondence error between the predicted pedestrian-control line locations and the candidate pedestrian-control line locations for optimal pedestrian-control line locations;

based on one or more of the first optimization and the second optimization, determine a second configuration of the intersection that includes the optimal locations of sides of the intersection and the optimal pedestrian-control line locations; and based on the second configuration of the intersection, navigate an autonomous vehicle through the intersection.

13. The system of claim 12, wherein the computer system is further configured to determine a roadgraph of the intersection that includes a symbolic representation of the second configuration of the intersection.

14. The system of claim 13, wherein the computer system is further configured to:
provide the roadgraph to the autonomous vehicle; and
based on the roadgraph, provide instructions to control the autonomous vehicle, wherein navigating the autonomous vehicle through the intersection is further based on the instructions.

15. The system of claim 12, wherein the plurality of parameters include one or more of parameters that define legs of the intersection, parameters that define lanes of the intersection, parameters that define medians in the intersection, and parameters that define lane connections of the intersection, wherein the lane connections define paths between lanes in the intersection.

16. The system of claim 12, wherein the map data includes at least one of an image map, an intensity map, or an elevation map.

17. The system of claim 12, wherein the first configuration of the intersection further includes predicted lane locations, and wherein the map data further includes candidate lane locations of the intersection, and wherein the computer system is further configured to:
perform a third optimization of the predicted lane locations to the candidate lane locations to minimize correspondence error between the predicted lane locations and the candidate lane locations for optimal lane locations, wherein determining the second configuration of the intersection is further based on the third optimization, wherein the second configuration further includes the optimal lane locations.

18. The system of claim 12, wherein performing the first optimization of the predicted locations of sides of the intersection to the candidate locations of sides of the intersection to minimize correspondence error between the predicted locations of sides of the intersection and the candidate locations of sides of the intersection for the optimal locations of sides of the intersection comprises minimizing a distance between the predicted locations of sides of the intersection and the candidate locations of sides of the intersection by varying the plurality of parameters, and wherein performing the second optimization of the predicted pedestrian-control line locations to the candidate pedestrian-control line locations to minimize correspondence error between the predicted pedestrian-control line locations and the candidate pedestrian-control line locations for the optimal pedestrian-control line locations comprises minimizing a distance between the predicted pedestrian-control line locations and the candidate pedestrian-control line locations by varying the plurality of parameters.

19. A non-transitory computer readable medium having stored therein instructions, that when executed by a computer system configured to control an autonomous vehicle, cause the computer system to perform functions comprising:
based on a plurality of parameters that define an intersection in a roadway of an environment, determining a first configuration of the intersection, wherein the first configuration of the intersection includes one or more of predicted locations of sides of the intersection and predicted pedestrian-control line locations of the intersection;

receiving map data based on a detection of the roadway in the environment by sensors on a vehicle that traverses the environment, wherein the map data includes one or more of candidate locations of sides of the intersection and candidate pedestrian-control line locations of the intersection;

performing a first optimization of the predicted locations of sides of the intersection to the candidate locations of sides of the intersection to minimize correspondence error between the predicted locations of sides of the intersection and the candidate locations of sides of the intersection for optimal locations of sides of the intersection;

performing a second optimization of the predicted pedestrian-control line locations to the candidate pedestrian-control line locations to minimize correspondence error between the predicted pedestrian-control line locations and the candidate pedestrian-control line locations for optimal pedestrian-control line locations;

based on one or more of the first optimization and the second optimization, determining a second configuration of the intersection that includes the optimal locations of sides of the intersection and the optimal pedestrian-control line locations; and based on the second configuration of the intersection, navigating the autonomous vehicle through the intersection.

20. The non-transitory computer readable medium of claim 19, wherein the plurality of parameters include one or more of parameters that define legs of the intersection, parameters that define lanes of the intersection, parameters that define medians in the intersection, and parameters that define lane connections of the intersection, wherein the lane connections define paths between lanes in the intersection.

21. The non-transitory computer readable medium of claim 19, wherein the first configuration of the intersection further includes predicted lane locations, and wherein the map data further includes candidate lane locations of the intersection, the functions further comprising:
   performing a third optimization of the predicted lane locations to the candidate lane locations to minimize correspondence error between the predicted lane locations and the candidate lane locations for optimal lane locations,
   wherein determining the second configuration of the intersection is further based on the third optimization, and
   wherein the second configuration further includes the optimal pedestrian-control line locations.

22. A method comprising:
   based on a plurality of parameters that define an intersection in a roadway of an environment, determining, by a computing device, a first configuration of the intersection, wherein the first configuration of the intersection includes one or more of predicted lane locations of the intersection and predicted pedestrian-control line locations of the intersection;
   receiving map data based on a detection of the roadway in the environment by sensors on a vehicle that traverses the environment, wherein the map data includes one or more of candidate lane locations of the intersection and candidate pedestrian-control line locations of the intersection;
   performing a first optimization of the predicted lane locations to the candidate lane locations to minimize correspondence error between the predicted lane locations and the candidate lane locations for optimal lane locations;
   performing a second optimization of the predicted pedestrian-control line locations to the candidate pedestrian-control line locations to minimize correspondence error between the predicted pedestrian-control line locations and the candidate pedestrian-control line locations for optimal pedestrian-control line locations;
   based on one or more of the first optimization and the second optimization, determining a second configuration of the intersection that includes the optimal lane locations and the optimal pedestrian-control line locations; and
   based on the second configuration of the intersection, navigating an autonomous vehicle through the intersection.

23. A method comprising:
   based on a plurality of parameters that define an intersection in a roadway of an environment, determining, by a computing device, a first configuration of the intersection, wherein the first configuration of the intersection includes one or more of predicted locations of sides of the intersection, predicted lane locations of the intersection, and predicted pedestrian-control line locations of the intersection;
   receiving map data based on a detection of the roadway in the environment by sensors on a vehicle that traverses the environment, wherein the map data includes one or more of candidate locations of sides of the intersection, candidate lane locations of the intersection, and candidate pedestrian-control line locations of the intersection;
   performing a first optimization of the predicted locations of sides of the intersection to the candidate locations of sides of the intersection to minimize correspondence error between the predicted locations of sides of the intersection and the candidate locations of sides of the intersection for optimal locations of sides of the intersection;
   performing a second optimization of the predicted lane locations to the candidate lane locations to minimize correspondence error between the predicted lane locations and the candidate lane locations for optimal lane locations;
   performing a third optimization of the predicted pedestrian-control line locations to the candidate pedestrian-control line locations to minimize correspondence error between the predicted pedestrian-control line locations and the candidate pedestrian-control line locations for optimal pedestrian-control line locations;
   based on one or more of the first optimization, the second optimization, and the third optimization, determining a second configuration of the intersection that includes the optimal locations of sides of the intersection, the optimal lane locations, and the optimal pedestrian-control line locations; and
   based on the second configuration of the intersection, navigating an autonomous vehicle through the intersection.

* * * * *